United States Patent
Kizaki (10) Patent No.: US 8,957,832 B2
(45) Date of Patent: Feb. 17, 2015

(54) METHOD AND APPARATUS FOR CONTROLLING DISPLAY MONITORS PROVIDED ON AN ELECTRONIC APPARATUS

(75) Inventor: Shigeru Kizaki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 604 days.

(21) Appl. No.: 12/948,948

(22) Filed: Nov. 18, 2010

(65) Prior Publication Data

US 2011/0063193 A1   Mar. 17, 2011

Related U.S. Application Data

(60) Division of application No. 12/169,320, filed on Jul. 8, 2008, now abandoned, which is a continuation of application No. 10/795,345, filed on Mar. 9, 2004, now Pat. No. 7,411,568.

(30) Foreign Application Priority Data

Mar. 10, 2003   (JP) ................................. 2003-063686

(51) Int. Cl.
*G09G 5/00*   (2006.01)
*G09G 5/36*   (2006.01)
*G06F 3/14*   (2006.01)

(52) U.S. Cl.
CPC ................ *G09G 5/006* (2013.01); *G09G 5/363* (2013.01); *G06F 3/1431* (2013.01); *G09G 2360/02* (2013.01); *G09G 2370/04* (2013.01)
USPC .............................. 345/1.3; 345/3.1; 345/204

(58) Field of Classification Search
CPC . G09G 5/003; G09G 3/2096; G09G 2360/04; G06F 3/0485
USPC .............. 345/1.1–1.3, 2.1, 2.3, 3.1, 204–215; 715/825–829
See application file for complete search history.

(56) References Cited

U.S. PATENT DOCUMENTS

| | | | |
|---|---|---|---|
| 5,710,570 A | 1/1998 | Wada et al. | |
| 5,859,623 A * | 1/1999 | Meyn et al. | ................... 715/730 |
| 6,721,881 B1 | 4/2004 | Bian et al. | |
| 6,759,996 B1 | 7/2004 | Someya et al. | |
| 6,784,855 B2 | 8/2004 | Matthews et al. | |

(Continued)

FOREIGN PATENT DOCUMENTS

| | | |
|---|---|---|
| JP | 3-226792 | 10/1991 |
| JP | 04-225392 | 8/1992 |

(Continued)

OTHER PUBLICATIONS

Chikashi Horikiri, "Investigate Fact of 'RGB Problem' Which Was Shaken Play Station 2," Nikkei Electronics, No. 770, Nikkei Business Publication Inc., May 22, 2000, pp. 55-60.

(Continued)

*Primary Examiner* — Kimnhung Nguyen
(74) *Attorney, Agent, or Firm* — Pillsbury Winthrop Shaw Pittman, LLP (57) ABSTRACT

Disclosed herein is an electronic apparatus that can use not only an LCD monitor provided as a standard component, but also a DVI monitor. The apparatus incorporates a BIOS. The BIOS acquires display parameters from the DVI monitor if the DVI monitor is connected to the apparatus and causes the DVI monitor to function as display device of the apparatus.

10 Claims, 5 Drawing Sheets

(56) References Cited

U.S. PATENT DOCUMENTS

| | | |
|---|---|---|
| 7,123,248 B1 | 10/2006 | Lafleur |
| 7,136,042 B2 | 11/2006 | Magendanz et al. |
| 7,161,557 B2 | 1/2007 | Thornton |
| 7,193,583 B2 | 3/2007 | Zerphy et al. |
| 7,327,355 B2 * | 2/2008 | Shin et al. ............. 345/204 |
| 2002/0080091 A1 | 6/2002 | Acharya et al. |
| 2003/0025685 A1 | 2/2003 | Shirasaki et al. |
| 2004/0075621 A1 | 4/2004 | Shiuan et al. |
| 2004/0095292 A1 | 5/2004 | Ogura |

FOREIGN PATENT DOCUMENTS

| | | |
|---|---|---|
| JP | 08-115063 | 5/1996 |
| JP | 11-212529 | 8/1999 |
| JP | 11-272250 | 10/1999 |
| JP | 2001-175230 | 6/2001 |
| JP | 2001-356752 | 12/2001 |
| JP | 2002-169532 | 6/2002 |
| JP | 2003-029729 | 1/2003 |
| WO | WO 02/060179 A1 | 8/2002 |

OTHER PUBLICATIONS

U.S. Office Action dated May 23, 2013 for U.S. Appl. No. 12/948,942.

Final Office Action mailed Sep. 19, 2013, in co-pending U.S. Appl. No. 12/948,942 (9 pages).

U.S. Office Action dated Feb. 4, 2014 for U.S. Appl. No. 12/948,942.

U.S. Office Action dated May 8, 2014 for U.S. Appl. No. 12/948,942.

* cited by examiner

METHOD AND APPARATUS FOR CONTROLLING DISPLAY MONITORS PROVIDED ON AN ELECTRONIC APPARATUS

CROSS-REFERENCE TO RELATED APPLICATIONS

This application is a divisional of U.S. application Ser. No. 12/169,320, filed Jul. 8, 2008 now abandoned, which is a continuation of U.S. application Ser. No. 10/795,345, filed Mar. 9, 2004, now U.S. Pat. No. 7,411,568 and for which priority is claimed under 35 U.S.C. §121 and §120. This application is based upon and claims the benefit of priority under 35 U.S.C. §119 from the prior Japanese Patent Application No. 2003-063686, filed Mar. 10, 2003, the entire contents of all applications are incorporated herein by reference in their entireties.

BACKGROUND OF THE INVENTION

1. Field of the Invention

The present invention relates generally to an electronic apparatus provided on which display monitors of different types can be used. More particularly, the invention relates to a technique of selectively controlling display monitors.

2. Description of the Related Art

Generally, electronic devices, such as notebook-type personal computers and mobile digital players, have a liquid crystal display (LCD) monitor as standard display.

In recent years, monitors (hereinafter referred to as "DVI monitors") that accord with the standards of digital displays called DVIs (Digital Visual Interfaces) are used in increasing numbers. The DVI monitor is a display that generates images directly from digital signals. It can display high-quality images.

A notebook-type personal computers has either an analog RGB monitor (usually, a CRT monitor) or an LCD monitor, no matter whether it can be connected to a DVI monitor or not. The user may use a DVI monitor to display images reproduced from, for example, a DVD drive or a TV tuner. Special utility software must be executed to use the DVI monitor. That is, it is necessary for the user to switch the standard monitor, e.g., an LCD monitor, to the DVI monitor.

Some computers have a DVI-monitor connector and the function of detecting the connection of a DVI monitor to the DVI-monitor connector. (Such a computer is disclosed in, for example, Jpn. Pat. Appln. KOKAI Publication No. 2002-169532.) In other words, any computer that has this function can automatically detect the connection of the DVI monitor to it.

Nonetheless, the user must do something to execute the special utility software to make the DVI monitor perform its function.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of this invention will be described, with reference to the accompanying drawings.
(System Configuration)

Figure 1:
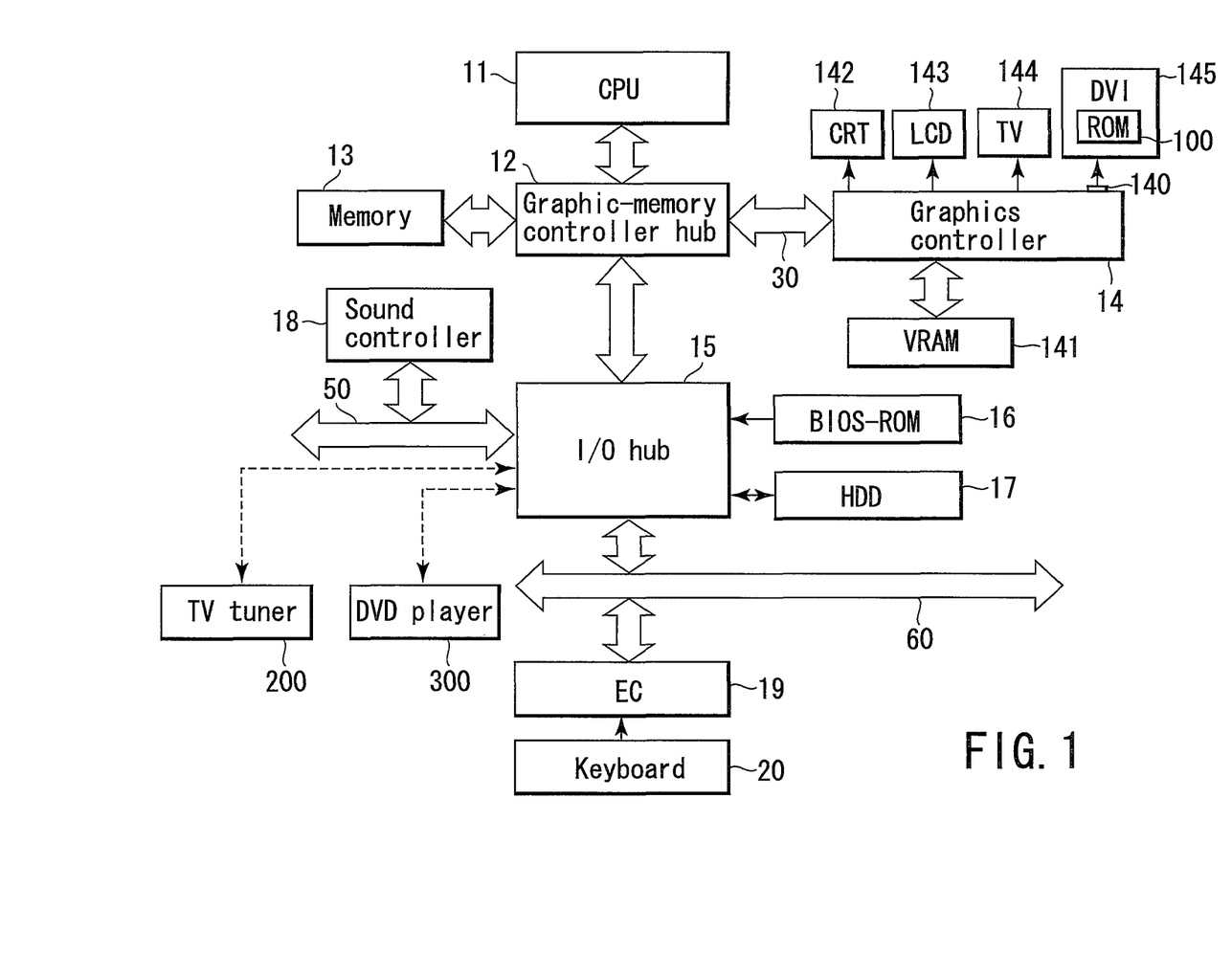
FIG. 1 is a block diagram showing the configuration of a computer system according to an embodiment of the present invention.
Figure 6:
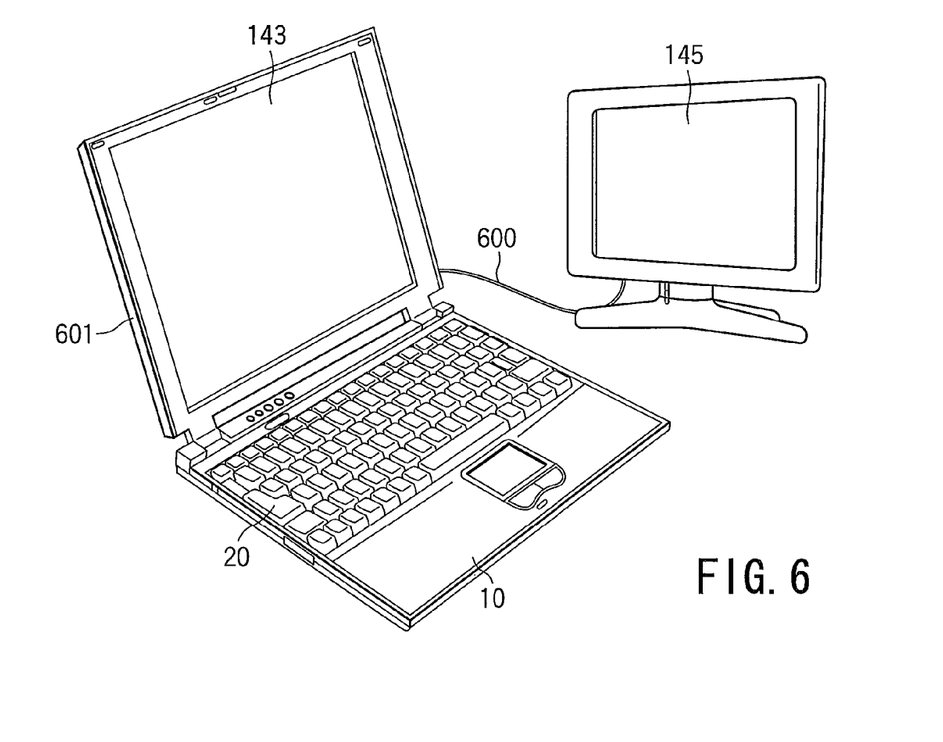
FIG. 6 is a perspective view of the computer system shown in FIG. 1.

FIG. 1 is a block diagram showing the system configuration of, for example, a notebook-type personal computer that is an electronic apparatus according to the present invention. FIG. 6 is a perspective view of the notebook-type personal computer.

As FIG. 1 shows, the computer has a microprocessor (CPU) 11, a graphic-memory controller hub 12, a memory (system memory) 13, a graphics controller 14, and an I/O hub 15.

The graphics controller 14 uses a video memory (VRAM) 141 and controls display devices 142 to 145 of different types.

The display device 142 is a CRT monitor including an analog RGB monitor. The display 144 is a television monitor (TV monitor). The display devices 142 and 144 can be connected to the graphics controller 14. The display device 143 is an LCD monitor that is permanently connected to the graphics controller 14.

Further, a DVI monitor 145 can be connected to the graphics controller 14 by a DVI-standard connector 140 as is illustrated in FIG. 6. The DVI monitor 145 accords with the distal-display standards and can display images of high resolution.

Usually the graphics controller 14 is connected to the graphic-memory controller hub 12 by an AGP (Accelerated Graphics Port) bus 30 that is a bus dedicated to graphic data. The graphics controller 14 outputs a digital video signal to the DVI monitor 145 if the monitor 145 is connected to it.

To the I/O hub 15 there are connected a ROM 16 and a hard disk drive (HDD) 17. The ROM (or BIOS-ROM) 16 stores BIOS (Basic Input/Output System). BIOS is a program that controls the display devices as will be later explained with reference to FIGS. 2 and 3.

A PCI (Peripheral Component Interconnect) bus 50 and an LPC (Low Pin Count) bus 60 are connected to the I/O hub 15, too. The PCI bus 50 connects a sound controller 18 to the I/O hub 15. The LPC bus 60 connects an embedded controller 19 (hereinafter referred to as "EC") to the I/O hub 15. The EC 19 is a microcomputer that functions as a controller. It controls the power supply and performs the input control at a keyboard 20. A TV tuner 200 and a DVD (Digital Video Disc) player 300 can be connected, as optional devices, to the I/O hub 15.

As FIG. 6 shows, the computer comprises a main unit 10 and a display unit 601. The display unit 601 is coupled to the main unit 10 and can rotate. The display unit 601 has an LCD monitor 143, which is a standard component.

As long as the computer remains unused, the display unit 601 usually takes a closed position, covering the keyboard 20 provided on the main unit 10. The main unit 10 incorporates main components, such as the CPU 11, graphic-memory controller hub 12, memory 13, graphics controller 14 and I/O hub 15, which are shown in FIG. 1.

In this embodiment, the main unit 10 has the DVI-standard connector 140 for connecting the DVI monitor 145 to the graphics controller 14. As FIG. 6 shows, a cable 600, which is connected to the DVI-standard connector 140, connects the DVI monitor 145 to the graphics controller 14.

As will be described later, the DVI monitor 145 is used as an external display device for the computer once it is connected to the graphics controller 14. Hence, the computer can cause the monitor 145 to display images.

(Sequence of Controlling the Display Devices)

Figure 2:
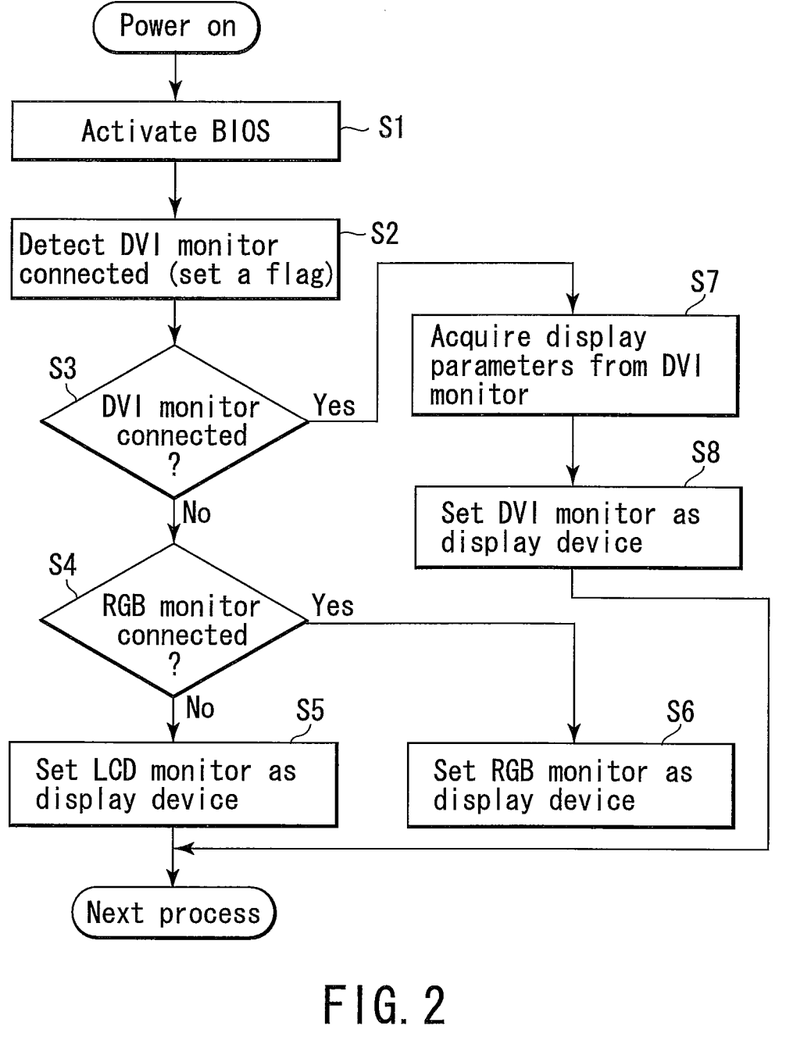
FIG. 2 is a flowchart explaining the sequence of a BIOS process performed in the computer system shown in FIG. 1.

How the display devices are controlled in the computer system according to the present embodiment will be described, with reference to FIG. 1 and the flowchart of FIG. 2.

When the power-supply switch to the system is closed, the BIOS is activated, performing various initialization processes (step S1). More precisely, the BIOS (program) is read from the BIOS-ROM 16 and stored into the memory 13. The BIOS thus stored into the memory 13 is activated.

The BIOS detects that the DVI monitor 145 has been connected to the graphics controller 14 (by the DVI-standard connector 140) (step S2). Upon detecting that DVI monitor 145 has been connected to the graphics controller 14, the BIOS sets a flag indicating this fact, in the memory 13.

Next, the BIOS determines, from the flag set in the memory 13, whether the DVI monitor 145 is connected to the graphics controller 14 (step S3).

If the BIOS determines that DVI monitor 145 is not connected to the graphics controller 14 (if NO in step S3), it determines whether an analog RGB monitor is connected to the graphics controller 14 (step S4). That is, the BIOS determines whether the CRT monitor 142 or TV monitor 144 is connected to the graphics controller 14 (step S4). If the CRT monitor 142 or TV monitor 144 is connected to the graphics controller 14, the BIOS initializes the CRT monitor 142 or TV monitor 144 so that the monitor connected to the controller 14 may perform its function (step S6).

If the analog RGB monitor is not connected to the graphics controller 14 (if NO in step S4), the BIOS initializes the LCD 143, i.e., the standard display, so that the LCD 143 may perform its function (step S5).

In step S3, the BIOS may determines, from the flag set in the memory 13, that the DVI monitor 145 is connected to the graphics controller 14 (YES in step S3). In this case, the BIOS reads display-parameter information from the ROM 100 incorporated in the DVI monitor 145 as shown in FIG. 1 (step S7).

The display-parameter information represents display parameters for controlling the DVI monitor 145, such as resolution, refresh rate and the like. The information is stored into the memory 13. The BIOS initializes the DVI monitor 145 in accordance with the display-parameter information, so that the DVI monitor 145 may work as the display device of the system (step S8). This enables the graphics controller 14 to control the DVI monitor 145.

Thus, the BIOS automatically can set the DVI monitor 145 as the display device of the computer system immediately after the power-supply switch to the system is closed, provided that the DVI monitor 145 is connected to the graphics controller 14. Hence, the user only needs to connect the DVI monitor 145 to the main unit 10 of the computer, in order to use this DVI monitor 145 that can display high-resolution images.

More specifically, the user connects the DVI monitor 145 to the DVI-standard connector 140 provided on the main unit 10 and turns on the DVI monitor 145. Then, the DVI monitor 145 will automatically function as the display device of the computer system. In other words, the user need not do anything special to use the DVI monitor 145 as the display device of the system.

(System Setup Menu)

Figure 3:
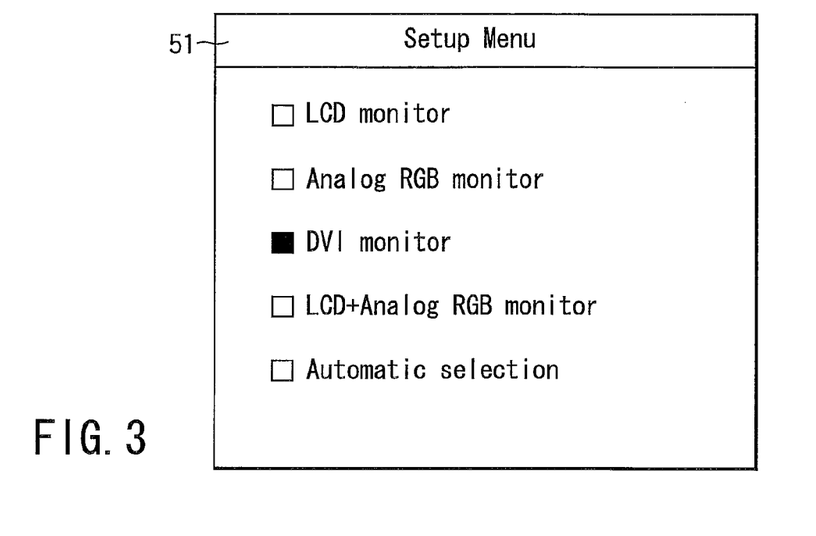
FIG. 3 is a diagram depicting a setup menu displayed on the computer system of FIG. 1.

FIG. 3 is a diagram depicting a setup menu 51 displayed on the computer system of FIG. 1.

As FIG. 3 shows, the setup menu 51 contains the names of the various display devices that can be used. The user can select one of the display devices, that should be set when the computer system is activated.

In FIG. 3, the square displayed besides "DVI Monitor" is black. This means that the DVI monitor 145 is selected and will be used as the display device of the system when the personal computer is activated. The other choices displayed in the setup menu 51, are: "LCD," "Analog RGB Monitor," "LCD+Analog RGB Monitor," and "Automatic Selection." Recall that the LCD monitor and the analog RGB monitor are the standard main display and external display to the personal computer, respectively. If the user selects the menu item "LCD+Analog RGB Monitor," both the LCD monitor and the analog RGB monitor will be used at the same time.

If the user selects the menu item "Automatic Selection," the external monitors connected to the main unit 10 will be detected when the personal computer is activated, and the external monitors that has the highest priority will be initialized first.

The information representing any menu item set in the setup menu 51 is stored into the BIOS-ROM 16.

Figure 4:
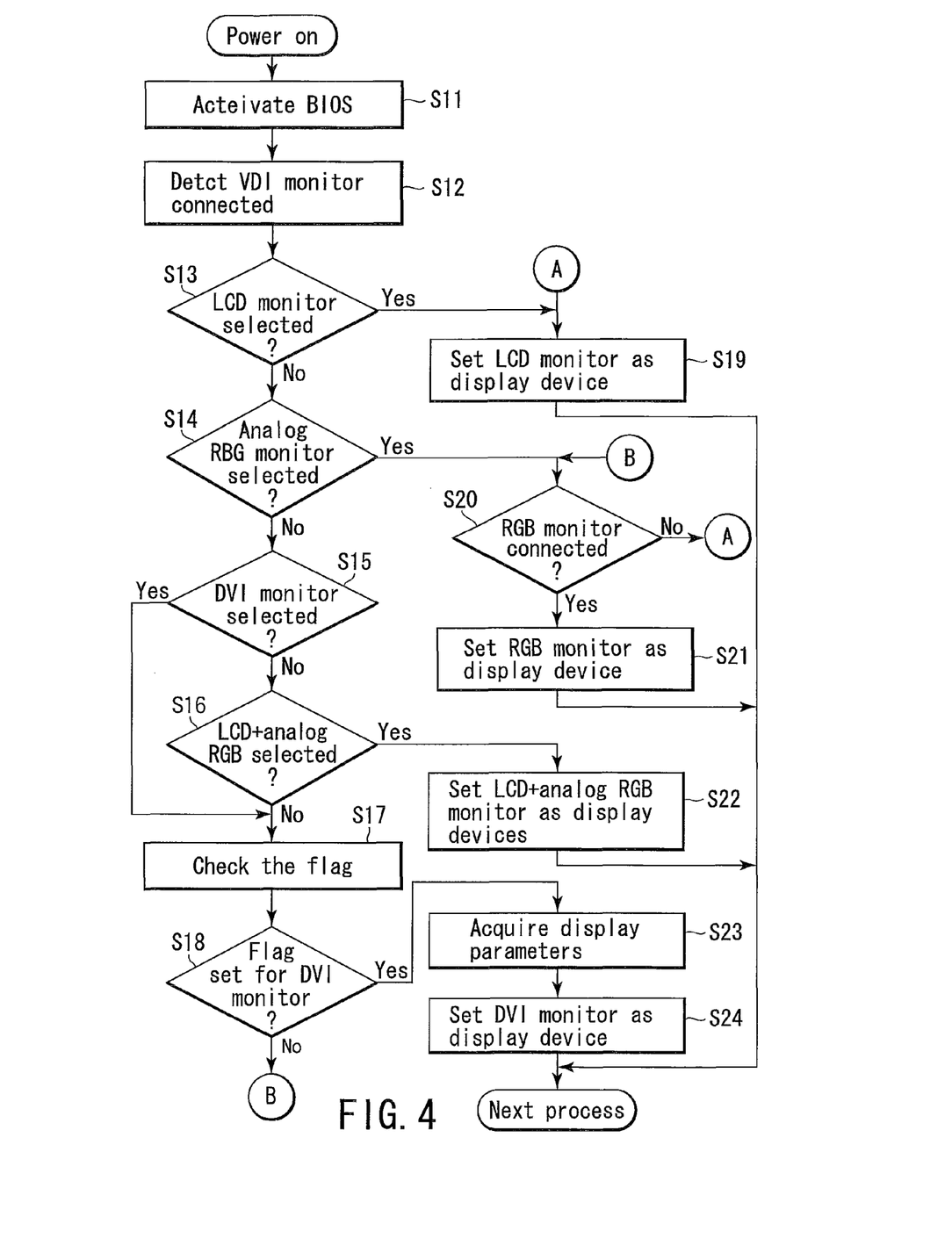
FIG. 4 is a flowchart explaining the sequence of a BIOS process carried out while the computer system is being set up.

FIG. 4 is a flowchart explaining the sequence of a BIOS process that is performed to set up one of the display devices.

First, the BIOS is activated, performing various initialization processes, when the power switch to the system is closed (step S11). At this time, part of the data in the BIOS-ROM 16 is copied into the memory 13, and the CPU 11 performs initialization. The data representing the setup menu 51 is copied into the memory 13, too.

In the process of setting up a display device or devices, the BIOS detects whether the DVI monitor 145 is connected to the graphics controller 14 (step S12). If the BIOS detects that the DVI monitor 145 is connected to the graphics controller 14, it sets the flag indicating the connection in the memory 13.

Next, the BIOS determines whether the LCD monitor 143 has been selected in the setup menu 51, from the display-setup data stored in the memory 13 (step S13). If the LCD monitor 143 has been selected (if YES in step S13), the BIOS initializes the LCD monitor 143, which can then function as display device (step S19).

If the LCD monitor 143 has not been selected (if NO in step S13), the BIOS determines whether an analog RGB monitor has been selected, from the display-setup data stored in the memory 13 (step S14). If an analog RGB monitor has been selected (if YES in step S14), the BIOS determines which RGB monitor is connected to the graphics controller 14, the CRT monitor 142 or the TV monitor 144 (step S20).

If the CRT monitor 142 or the TV monitor 144 is connected to the graphics controller 14 (if YES in step S20), the BIOS initializes the monitor connected, so that the monitor may function as display device (step S21). Neither the CRT monitor 142 nor the TV monitor 144 may be connected to the graphics controller 14 (No in step S20) even if the analog RGB monitor has been designated to be preferentially used as display device. In this case, the BIOS initializes the LCD monitor 143 that is a standard component, so that the LCD monitor 143 may function as display device (step S19).

If no analog RGB monitor has been selected in the setup menu 51 (if NO in step S14), the BIOS determines whether the DVI monitor 145 has been selected, on the basis of the display-setup data stored in the memory 13 (step S15). If the DVI monitor 145 is selected (if YES in step S15), the BIOS checks the flag set in the set in the memory 13 (step S17). Then, the BIOS determines whether the flag designates the DVI monitor 145 (step S18). If the flag designates the DVI monitor 145 (if YES in step S18), the BIOS determines that the DVI monitor 145 is connected to the graphics controller 14.

Thus, the BIOS acquires display parameters from the ROM 100 that is incorporated in the DVI monitor 145 (step S23). Further, the BIOS initializes the DVI monitor 145 in accordance with the display parameters acquired from the ROM 100, so that the DVI monitor 145 may function as display device of the system (step S24).

The flag set in the memory 13 may not designate the DVI monitor 145 (if NO in step S18). Then, the BIOS determines that the DVI monitor 145 is not connected to the graphics controller 14. The BIOS then determines whether an analog RGB monitor is connected to the controller 14 (step S20). That is, the BIOS designates the either the CRT monitor 142 or the TV monitor 144 as display device of the system (step S21) if the monitor 142 or 244 is connected to the controller 14, instead of the DVI monitor 145 (if YES in step S20).

Neither the CRT monitor 142 nor the TV monitor 144 may be connected to the graphics controller 14 (NO in step S20). In this case, the BIOS designates the LCD monitor 143 as display device of the system (step S19).

The BIOS may determine that the DVI monitor 145 is not selected (if NO in step S15). If this is the case, the BIOS determine whether both the LCD monitor 143 and the analog RGB monitor have been selected, on the basis of the display-setup data stored in the memory 13 (step S16). If YES in step S16, the BIOS designates both the LCD monitor 143 and the analog RGB monitor as display devices of the system (step S22). In effect, however, either the CRT monitor 142 or the TV monitor 144 must be connected as analog RGB monitor to the graphics controller 14. If neither the CRT monitor 142 nor the TV monitor 144 is connected, only the LCD monitor 143 will work as sole display device of the system.

The user may select "Automatic Selection" in the setup menu 51. In this case, the BIOS initializes the display devices, one after another, in the order of priority as will be described below.

If the DVI monitor 145 is connected to the graphics controller 14, the BIOS will designate this monitor 145 as display device of the system. If an analog RGB monitor, i.e., either CRT monitor 142 or TV monitor 144, is connected to the controller 14, it will be used as display device of the system. Neither the CRT monitor 142 or the TV monitor 144 may be connected to the controller 14. Then, the BIOS designates the LCD monitor 143, i.e., a standard component, as display device of the system.

In brief, the BIOS automatically designates the DVI monitor 145 as display device of the system if the DVI monitor 145 has been selected in the setup menu 51 and is actually connected to the graphics controller 14. Thus, the DVI monitor 145 will automatically function as display device when the user connects this monitor 145 to the main unit 10 and turns on the power switch to the system, only if the user has selected the DVI monitor 145, in the setup menu 51, as the first display device to be used.

(Another Embodiment)

Figure 5:
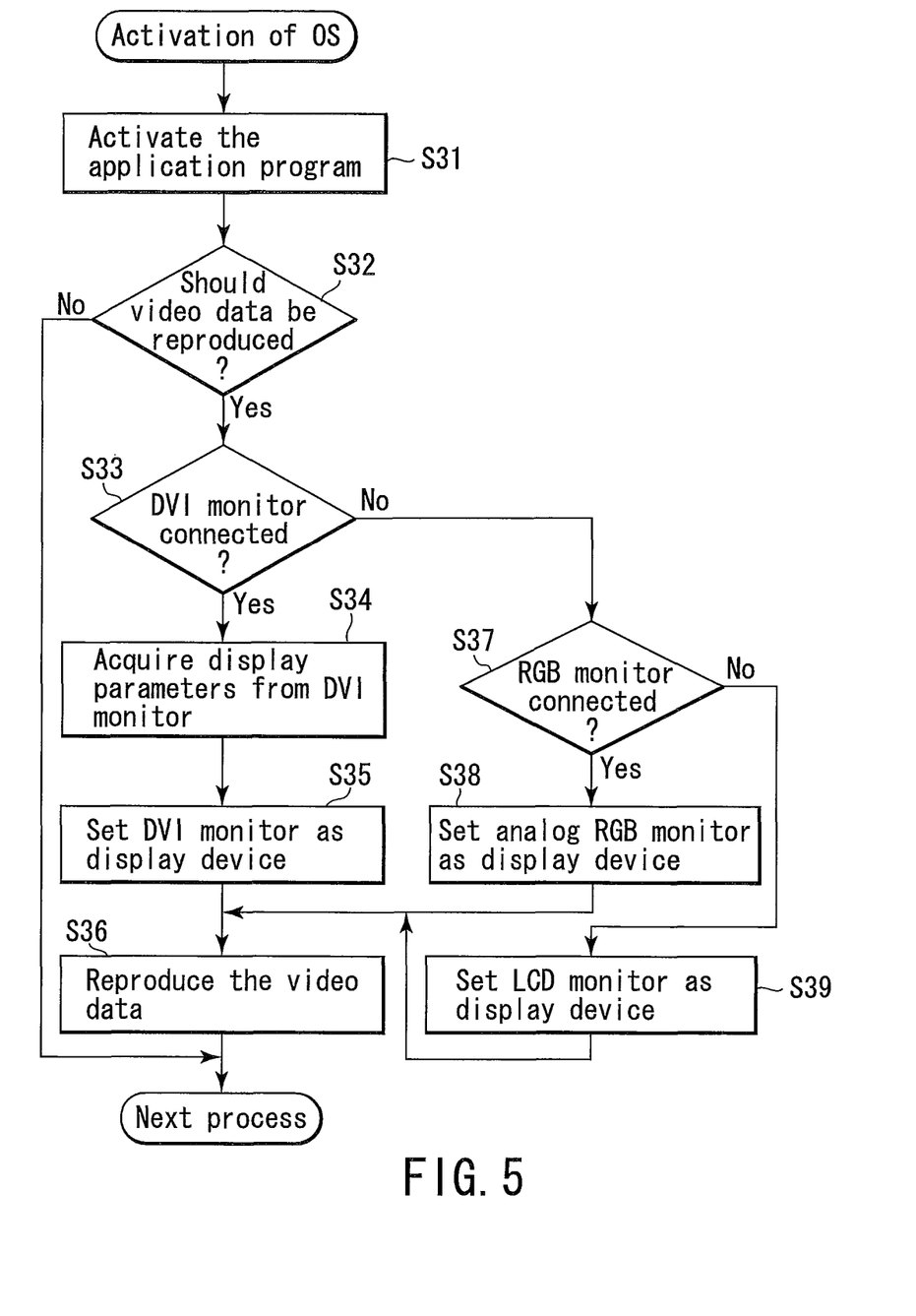
FIG. 5 is a flowchart explaining the operation of another embodiment of the present invention.

FIG. 5 is a flowchart explaining the operation of another embodiment of the present invention.

In this embodiment, the display device is switched by using application software that is executed under the control of the OS (Operating System) once the OS has been activated.

As indicated above, the sequence of initialization, including the designating a display device, is carried out when the BIOS is activated immediately after the closing of the power switch to the system. More correctly, the LCD monitor 143 is initialized upon activation of the BIOS and is then used prior to any other display device available. After the BIOS finishes the initialization, the OS is activated, whereby the various applications can be executed.

Assume that the DVD (Digital Video Disc) player 300 is connected to the I/O hub 15 as illustrated in FIG. 1. In this case, the system activates the video-data reproducing application program stored in the HDD 17 (step S31). The OS determines whether video data should be reproduced from the DVD incorporated in the DVD player 300 (step S32). If YES in step S32, the system will start the process of reproducing video data from the DVD.

At this time, the OS checks the flag set in the memory 13, determining whether the DVI monitor 145 is connected to the graphics controller 14 (step S33). As mentioned earlier, the BIOS has set the flag in the memory 13 right after the closing of the power switch to the system.

The OS may determine that the DVI monitor 145 is connected to the graphics controller 14 (YES in step S33). Then, the OS acquires display parameters from the ROM 100 incorporated in the DVI monitor 145 (step S34).

Further, the OS switches the display device selected at this time, e.g., the LCD monitor 143, to the DVI monitor 145 that should be used as display device of the system (step S35).

Therefore, the video-data reproducing application program reproduces video data from the DVD set in the DVD player 300 and the DVI monitor 145. The graphics controller 14 outputs the video data thus reproduced, to the DVI monitor 145. The DVI monitor 145 displays the high-resolution images represented by the video data (step S36).

The OS may not determine that the DVI monitor 145 is connected to the graphics controller 14 (NO in step S33). If this is the case, the OS acquires determines whether the analog RGB monitor is actually connected to the graphics controller 14 (step S37). If the analog RGB monitor is connected to the controller 14, instead of the DVI monitor 145 (if YES in step S37), the OS selects the CRT monitor 142 or the TV monitor 144 as display device of the system (step S38).

Thus, the video-data reproducing application program reproduces the video data from the DVD set in the DVD player 300 and the CRT monitor 142 or the TV monitor 144 displays the images represented by the video data reproduced (step S36).

If neither the DVI monitor 145 nor the analog RGB monitor is connected to the graphics controller 14 (if NO in steps S33 and S37), the OS keeps designating the LCD monitor 143 (the standard component) as display device of the system (step S39). Therefore, the video-data reproducing application program reproduces the video data from the DVD set in the DVD player 300 and the LCD monitor 143 displays the images represented by the video data thus reproduced (step S36).

In the embodiments of this invention described above, the OS switches the display device initially selected (e.g., LCD monitor 143) to the DVI monitor 145 when the video-data reproducing application program is activated. Hence, the DVI monitor 145 will be automatically selected as display device of the system when it is connected to the system to display, for example, the high-resolution images represented by the video data stored in a DVD. To have high-resolution images displayed on the DVI monitor 145, the user need not do anything, but connect the DVI monitor 145 to the system.

Each embodiment described above is a notebook-type personal computer that uses the LCD monitor (i.e., a standard component). The present invention is not limited to such personal computers. Rather, it can be applied to electronic apparatuses of any other type that can use various types of display devices, one of which is selected by the method explained above.

More specifically, the invention can be applied to, for example, a portable DVD player that comprises a TV tuner and an LCD monitor (a standard component). When a DVI monitor, i.e., an optional component, is connected to the DVD player, it is automatically designated as display device of the DVD player. The user of the DVD player can use a DVI monitor, if available, only by connecting the DVI monitor to the DVD player. In any place where no DVI monitors are unavailable, the user uses the LCD monitor.

As has been described in detail, the present invention makes it possible for the user of an electronic apparatus to use a DVI monitor that can display high-resolution images, merely by connecting the DVI monitor to the electronic apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus connectable to display units, the electronic apparatus comprising:
   a menu display to allow a user to select one of the display units or to select an automatic selection;
   a detector to detect whether the selected display unit is connected to the electronic apparatus when one of the display units is selected in the menu, and to detect whether at least one predetermined display unit selected from the display units is connected to the electronic apparatus when the automatic selection is selected in the menu; and
   a controller to set up the selected display unit when the detector detects that the selected display unit is connected to the electronic apparatus and to set up one of the at least one predetermined display unit when the detector detects that one of the at least one predetermined display unit is connected to the electronic apparatus.

2. The electronic apparatus of claim 1, wherein the display units comprise an internal display, a DVI monitor and an RGB monitor.

3. An electronic apparatus, comprising:
   a graphics controller to output an analog video signal and a digital video signal;
   a first interface connected to the graphics controller, connectable to a first display unit, and to output the digital video signal to the first display unit;
   a second interface connected to the graphics controller, connectable to a second display unit, and to output the analog video signal to the second display unit;
   a menu display to allow a user to select one of the first display unit and the second display unit or to select an automatic selection;
   a detector to detect whether the selected display unit is connected to the electronic apparatus when one of the first display unit and the second display unit is selected in the menu, and to detect whether at least one predetermined display unit selected from the first display unit and the second display unit is connected to the electronic apparatus when the automatic selection is selected in the menu; and
   a controller to set up the selected display unit when the detector detects that the selected display unit is connected to the electronic apparatus and to set up one of the at least one predetermined display unit when the detector detects that one of the at least one predetermined display unit is connected to the electronic apparatus.

4. The electronic apparatus of claim 3, wherein the first display unit comprises a DVI monitor and the second display unit comprises an analog RGB monitor.

5. The electronic apparatus of claim 4, wherein
   when the automatic selection is selected in the menu, the detector first detects whether the DVI monitor is connected to the electronic apparatus, and then detects whether the analog RGB monitor is connected to the electronic apparatus if the DVI monitor is not connected to the electronic apparatus.

6. A non-transitory computer-readable storage medium having stored thereon a computer program which is executable by a computer, the computer being connectable to display units, the computer program comprising instructions capable of causing the computer to execute functions of:
   displaying a menu allowing a user to select one of the display units or to select an automatic selection;
   detecting whether the selected display unit is connected to the electronic apparatus when one of the display units is selected in the menu, and to detect whether at least one predetermined display unit selected from the display units is connected to the electronic apparatus when the automatic selection is selected in the menu; and
   setting up the selected display unit when the detector detects that the selected display unit is connected to the electronic apparatus and to set up one of the at least one predetermined display unit when the detector detects that one of the at least one predetermined display unit is connected to the electronic apparatus.

7. The non-transitory computer-readable storage medium of claim 6, wherein, when the automatic selection is selected in the menu, the detecting comprises detecting whether a DVI monitor is connected to the electronic apparatus, and then detecting whether an analog RGB monitor is connected to the electronic apparatus if the DVI monitor is not connected to the electronic apparatus.

8. A method for an electronic apparatus connectable to display units, the method comprising:
   displaying a menu allowing a user to select one of the display units or to select an automatic selection;
   detecting whether the selected display unit is connected to the electronic apparatus when one of the display units is selected in the menu, and to detect whether at least one predetermined display unit selected from the display units is connected to the electronic apparatus when the automatic selection is selected in the menu; and
   setting up the selected display unit when the detector detects that the selected display unit is connected to the electronic apparatus and to set up one of the at least one predetermined display unit when the detector detects that one of the at least one predetermined display unit is connected to the electronic apparatus.

9. The method of claim 8, wherein
   when the automatic selection is selected in the menu, the detecting comprises detecting whether a DVI monitor is connected to the electronic apparatus, and then detecting whether an analog RGB monitor is connected to the electronic apparatus if the DVI monitor is not connected to the electronic apparatus.

10. The electronic apparatus of claim 2, wherein when the automatic selection is selected in the menu, the detector first detects whether the DVI monitor is connected to the electronic apparatus, and then detects whether the analog RGB monitor is connected to the electronic apparatus if the DVI monitor is not connected to the electronic apparatus, and the controller sets up the internal display if neither of the DVI monitor and the analog RGB monitor is connected to the electronic apparatus.

\* \* \* \* \*